(12) United States Patent
Harada et al.

(10) Patent No.: US 10,689,741 B2
(45) Date of Patent: Jun. 23, 2020

(54) NI-BASED SUPERALLOY PART RECYCLING METHOD

(71) Applicant: NATIONAL INSTITUTE FOR MATERIALS SCIENCE, Ibaraki (JP)

(72) Inventors: Hiroshi Harada, Ibaraki (JP); Kyoko Kawagishi, Ibaraki (JP); Toshiharu Kobayashi, Ibaraki (JP); Tadaharu Yokokawa, Ibaraki (JP); Makoto Osawa, Ibaraki (JP); Michinari Yuyama, Ibaraki (JP); Shinsuke Suzuki, Tokyo (JP); Yuichiro Joh, Tokyo (JP); Satoshi Utada, Tokyo (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 195 days.

(21) Appl. No.: 15/932,302

(22) PCT Filed: May 30, 2016

(86) PCT No.: PCT/JP2016/065901
§ 371 (c)(1),
(2) Date: Feb. 16, 2018

(87) PCT Pub. No.: WO2017/029856
PCT Pub. Date: Feb. 23, 2017

(65) Prior Publication Data
US 2019/0010594 A1    Jan. 10, 2019

(30) Foreign Application Priority Data

Aug. 18, 2015  (JP) ................................ 2015-160748

(51) Int. Cl.
*C22F 1/10* (2006.01)
*C22B 23/02* (2006.01)
(Continued)

(52) U.S. Cl.
CPC .................. *C22F 1/10* (2013.01); *B09B 3/00* (2013.01); *C22B 7/00* (2013.01); *C22B 7/003* (2013.01);
(Continued)

(58) Field of Classification Search
CPC ... C22F 1/10; C22B 23/02; C22B 7/00; C22B 7/003; C22C 1/02; C22C 1/023; B09B 3/00
See application file for complete search history.

(56) References Cited

U.S. PATENT DOCUMENTS

| 4,753,686 | A | | 6/1988 | Company et al. |
| 5,346,563 | A | * | 9/1994 | Allen ........................ C21D 3/02 |
| | | | | 148/675 |

(Continued)

FOREIGN PATENT DOCUMENTS

| JP | 61-67729 | 4/1986 |
| JP | 64-42516 | 2/1989 |

(Continued)

OTHER PUBLICATIONS

Notification of Reasons for Refusal dated Mar. 5, 2019, in Japanese Application No. 2017-535266, with English machine Translation.

(Continued)

*Primary Examiner* — Jessee R Roe
(74) *Attorney, Agent, or Firm* — Wenderoth, Lind & Ponack, L.L.P.

(57) ABSTRACT

A method for recycling a Ni-based single crystal superalloy part or unidirectionally solidified superalloy part provided with a thermal barrier coating containing at least a ceramic on a surface of a Ni-based single crystal superalloy substrate or Ni-based unidirectionally solidified superalloy substrate, in which the method including the steps of: melting and (Continued)

desulfurizing a Ni-based single crystal superalloy part or Ni-based unidirectionally solidified superalloy part at a temperature of the melting point or more of the Ni-based single crystal superalloy or Ni-based unidirectionally solidified superalloy and less than the melting point of the ceramic; heating a casting mold for a recycled Ni-based single crystal superalloy part or casting mold for a recycled Ni-based unidirectionally solidified superalloy part to a temperature of the melting point or more of the Ni-based single crystal superalloy or Ni-based unidirectionally solidified superalloy; pouring the desulfurized melted Ni-based single crystal superalloy or Ni-based unidirectionally solidified superalloy into the casting mold, and producing a melting stock or growing a Ni-based single crystal superalloy or Ni-based unidirectionally solidified superalloy; and removing the melting stock or the recycled Ni-based single crystal superalloy part or recycled Ni-based unidirectionally solidified superalloy part from the casting mold. In this way, a method for recycling a Ni-based superalloy part, by which the recycle cost of a Ni-based superalloy part and the lifetime cost of a highly efficient gas turbine engine using a Ni-based superalloy part can be significantly reduced, and further a Ni-based superalloy part having the same high-temperature strength and oxidation resistance as those of a newly produced Ni-based superalloy part can be obtained, is provided.

18 Claims, 9 Drawing Sheets

(51) Int. Cl.
  *C22C 1/02* (2006.01)
  *C22B 7/00* (2006.01)
  *B09B 3/00* (2006.01)
(52) U.S. Cl.
  CPC ............... *C22B 23/02* (2013.01); *C22C 1/02* (2013.01); *C22C 1/023* (2013.01); *B09B 3/0083* (2013.01); *C21D 2201/04* (2013.01); *Y02P 10/224* (2015.11); *Y02T 50/6765* (2018.05)

(56) References Cited

U.S. PATENT DOCUMENTS

| | | |
|---|---|---|
| 5,776,329 A | 7/1998 | Krynitz et al. |
| 5,922,148 A | 7/1999 | Irvine et al. |
| 6,024,792 A | 2/2000 | Kurz et al. |
| 2010/0025454 A1 | 2/2010 | Heinz et al. |

FOREIGN PATENT DOCUMENTS

| | | |
|---|---|---|
| JP | 3-236434 | 10/1991 |
| JP | 3069580 | 7/2000 |
| JP | 2009-114544 | 5/2009 |
| JP | 2014-70231 | 4/2014 |
| JP | 2014-173142 | 9/2014 |

OTHER PUBLICATIONS

Decision of Refusal dated May 28, 2019 in Japanese Patent Application No. 2017-535266, with Machine Translation.
Utada et al., "Influence of sulfur on high temperature properties of second generation Ni base single crystal superalloy PWA 1484 and property recovery by CaO turbo desulfurization", The Japan Institute of Metals Spring Conference, Poster Seesion, 2015, 6 pages, with Machine Translation.
Sakai et al., "Life Extension Technologies for Gas Turbine Hot Parts", Gad Turbine Society of Japan, 2009, 32 pages with Machine Translation.
Scott M., "Sulfidation: Turbine Blade Corrosion", Aircraft Maintenance Technology, 2008, 8 pages.
W. Betz et al. (Editor), "High Temperature Alloys for Gas Turbines and Other Applications 1986", Oct. 1986, D. Reidel Publishing Company, D.p 787.
Takaya Hamai, "Metal Resources Report, Trends in demand, supply and price of rhenium", Rare metal series 2011, National Research and Development Institute of Japan Oil, Gas and Metals National Corporation, Nov. 30, 2011, with English translation.
International Search Report dated Aug. 30, 2016 in International (PCT) Application No. PCT/JP2016/065901.

* cited by examiner

NI-BASED SUPERALLOY PART RECYCLING METHOD

TECHNICAL FIELD

The present invention relates to a method for recycling a Ni-based single crystal superalloy part or a method for recycling a Ni-based unidirectionally solidified superalloy part, which are suitable for use in a case where a scrapped material of the Ni-based single crystal superalloy part or Ni-based unidirectionally solidified superalloy part once used is used again as a Ni-based superalloy for a turbine rotor blade, a turbine vane, or the like of a jet engine, a gas turbine, or the like without refining the superalloy and recovering the alloy elements.

BACKGROUND ART

There are three types of Ni-based superalloy, polycrystal, unidirectional solidification, and single crystal depending on the casting method. Regarding the strength, the Ni-based single crystal superalloy has the highest strength, then the Ni-based unidirectionally solidified superalloy and the Ni-based polycrystalline superalloy in this order.

In addition, the Ni-based superalloy part using the above-described superalloys is used, for example, as a turbine rotor blade or a turbine vane of a jet engine, a gas turbine, or the like. For example, in a jet engine, the turbine inlet gas temperature is a high temperature of 1000° C. to 1700° C., which is equivalent to the melting point of nickel of 1453° C. and the melting point of iron of 1535° C. In general, the higher the turbine inlet gas temperature is, the higher the energy efficiency is, and the rise in fuel price is offset by the improvement of engine efficiency.

On the other hand, since the turbine inlet gas temperature is often higher than the melting point temperature of nickel, a turbine rotor blade and a turbine vane are treated as expendables even in a case where thermal barrier coating is applied. For example, when a jet plane takes off, if the thermal barrier coating of the jet engine parts is peeled off by a cloud of dust or the like, the damage of a turbine rotor blade and a turbine vane progresses during a flight. The damaged turbine rotor blades and turbine vanes are exchanged during the periodic inspection. The replaced turbine rotor blades and turbine vanes are repaired (there may be a case where a regeneration treatment as described in Patent Literatures 1, 2, 3, and 4 described later is included) if the damage is minor, and are discarded if the damage is severe. Repeated repairs will be limited to several times at most, therefore, currently all of the turbine rotor blades and turbine vanes are eventually discarded.

Therefore, in Patent Literature 1, a method for regenerating a turbine rotor blade and a turbine vane, which are made of a cast polycrystalline Ni-based superalloy and have damaged by creep, has been proposed (hereinafter, the process to be performed for the purpose of repairing a part is referred to as regeneration, and the process to be performed for the purpose of reusing an unrepairable part as the part again is referred to as recycling). Further, in Patent Literature 2, it has been proposed that in a case where the strength is deteriorated due to the use at high temperature, by performing a complete solution heat treatment and an aging heat treatment on the Ni-based superalloy material, the remaining life of the single crystal material is extended.

The regeneration method in Patent Literatures 1 and 2 is a method for regenerating a metal structure on a Ni-based superalloy material by a regeneration heat treatment. The regeneration heat treatment is a method of restoring the deteriorated microstructure of a metal only by a heat treatment, the deteriorated structure is once extinguished by a solution treatment, and then a sound fine precipitated structure is regenerated again by an aging treatment. For this reason, in a case where the degree of the damage to a turbine rotor blade and a turbine vane is large, the turbine rotor blade and turbine vane cannot be coped with by the regeneration heat treatment, and have to be discarded.

Furthermore, in Patent Literature 3, in a case where the strength of a Ni-based superalloy part is deteriorated due to the use at high temperature, when a rejuvenation treatment, a regeneration treatment, or a repairing is performed, a heat-resistant protective layer is once removed, then a corrosion layer, an oxide layer, a corrosion product, and an oxidation product are also removed, and further cracks of the heat-resistant protective layer are repaired. After that, it has been proposed to recoat the heat-resistant protective layer.

In addition, in a Ni-based superalloy part, with respect to abrasion and cracks of the alloy substrate, repair of the abrasion and cracks is performed while maintaining the single crystal by the method shown, for example, in Patent Literature 4. However, eventually, when the product life has run out and the product becomes a used scrapped material, the product cannot be regenerated by the regeneration treatment proposed in Patent Literatures 1, 2, 3, and 4, and only some expensive elements are refined from a part material at a high cost by the method shown, for example, in Patent Literature 5.

In general, it is known that a Ni-based superalloy part is highly susceptible to contamination by impurity elements (see, for example, Non Patent Literature 1). In fact, in the conventional cast polycrystalline turbine rotor blades, turbine vanes, and the like, creep characteristics, thermal fatigue characteristics, and environmental resistance characteristics of a superalloy recycled by remelting cannot be guaranteed. For this reason, recycling while maintaining almost the composition of the superalloy by remelting of the Ni-based superalloy part once used has not been performed at all by airline companies and power generation companies that own jet engines and gas turbines that are products.

On the other hand, there may be a case where a NI-based superalloy part contains an expensive rare metal such as hafnium, and rhenium. Rare metals have price problems, and the resource-rich countries are unevenly distributed, therefore, it may be difficult to stably secure the supplier. For this reason, when trying to produce a new product, under the influence of price fluctuations and a supply risk of rare metals, a situation where it is difficult to provide a product at the delivery time and the price, which have been contracted with a customer, frequently occurs (see, for example, Rhenium export suspension measures in Kazakhstan in 2007, in Non Patent Literature 2), and the price stabilization and the stable supply have been strongly demanded.

Accordingly, the present inventors have proposed a production process of a recycled product while maintaining almost the composition of the superalloy by remelting the Ni-based superalloy part once used in Patent Literature 6. However, at the present stage, a recycled product has not been used yet by airline companies and power generation companies.

CITATION LIST

Patent Literature

Patent Literature 1: JP 61-119661 A
Patent Literature 2: JP 3069580 B2

Patent Literature 3: JP 2010-520814 A
Patent Literature 4: U.S. Pat. No. 6,024,792
Patent Literature 5: JP 10-508657 A
Patent Literature 6: JP 2014-70231 A Non Patent Literature Non Patent Literature 1: High Temperature Alloys for Gas Turbines and Other Applications 1986 (D. Reidel Publishing Company) D.p. 787

Non Patent Literature 2: Metal Resources Report, Trends in demand, supply and price of rhenium, Rare metal series 2011, National Research and Development Institute of Japan Oil, Gas and Metals National Corporation, Nov. 30, 2011

SUMMARY OF INVENTION

Technical Problem

The present invention is to solve the problems described above, and an object of the present invention is to provide a method for recycling a Ni-based superalloy part, by which the recycle cost of a Ni-based superalloy part and the lifetime cost of a highly efficient gas turbine engine using a Ni-based superalloy part can be significantly reduced, and further a Ni-based superalloy part having the same high-temperature strength and oxidation resistance as those of a newly produced Ni-based superalloy part can be obtained.

Solution to Problem

That is, the present inventors have conducted intensive studies to examine the reason why the creep characteristics, thermal fatigue characteristics, and environmental resistance characteristics, which are required for a turbine rotor blade and a turbine vane, cannot be maintained due to contamination by impurity elements in a Ni-based superalloy. In a NI-based superalloy, by segregation of these impurity elements into crystal grain boundaries, the crystal grain boundaries are weakened, and the alloy strength is lowered, and the lowered alloy strength is a cause of the failure to maintain the creep characteristics required for a turbine rotor blade and a turbine vane. Therefore, the present inventors have further conducted intensive studies, as a result, it is clarified that particularly sulfur among the impurity elements adversely affects the strength and oxidation resistance, and further a technique to recover the creep rupture life and oxidation resistance to be equivalent to those of the genuine material by desulfurizing at the time of melting and by correcting the composition changed due to the desulfurization and other reasons to be equivalent to that of the genuine material has been developed. As a result, the present inventors have invented a method for recycling a jet engine part and a gas turbine part by direct remelting in a state having the creep rupture life and oxidation resistance to be equivalent to those of the genuine material.

A method for recycling a Ni-based single crystal superalloy part of a first invention is, for example, as shown in FIG. 2, a method for recycling a Ni-based single crystal superalloy part in a case where a coating layer of a thermal barrier coating is damaged or damage occurs to a Ni-based single crystal superalloy substrate in a Ni-based single crystal superalloy part coated with the thermal barrier coating containing a ceramic, which includes a step (S104) of melting and desulfurizing the Ni-based single crystal superalloy part at a temperature of the melting point or more of the Ni-based single crystal superalloy and less than the melting point of the ceramic; a step (S106) of heating a casting mold for a recycled Ni-based single crystal superalloy part to have a temperature of the melting temperature or more of the Ni-based single crystal superalloy; a step (S108, or S110) of pouring a desulfurized melted Ni-based single crystal superalloy into a casting mold for a melting stock or a casting mold for a recycled Ni-based single crystal superalloy part to produce an alloy ingot (hereinafter, referred to as melting stock) to be used as a casting raw material, or of growing the Ni-based single crystal superalloy; and a step (S112) of removing the melting stock or the recycled Ni-based single crystal superalloy part from the casting mold for a melting stock or the casting mold for a recycled Ni-based single crystal superalloy part.

In the method for recycling a Ni-based single crystal superalloy part of a first invention constituted as described above, since the recovered Ni-based single crystal superalloy part is damaged, there may be impurities on the surface thereof, and it is preferred to wash the Ni-based single crystal superalloy part. Herein, the damage caused in the coating layer of the thermal barrier coating includes peeling, floating, chipping, sintering, and melting. The damage caused in the Ni-based single crystal superalloy substrate include cracks, deformation, chipping, corrosion, formation of an oxide layer, adhesion of a corrosion product, adhesion of an oxidation product, deterioration of metal structure, and a melting type.

Next, a Ni-based single crystal superalloy part is melted and desulfurized, and the melting temperature is set to be a temperature of the melting point or more of the Ni-based single crystal superalloy and less than the melting point of the ceramic. The lower limit value of the melting temperature is required to be higher than the temperature in the vicinity of 1350° C. that is the melting point of the Ni-based single crystal superalloy, and is set to a temperature at which the melting rate is practically obtainable, for example, 1500° C. to 1600° C. The upper limit value of the melting temperature is required to be lower than the melting point of 2050° C. in a case where the ceramic is alumina or the melting point of 2720° C. of zirconia, on the other hand, if the melting temperature is excessively increased, evaporation of alloy elements becomes severe and the composition control becomes difficult, therefore, the upper limit value is preferably 2000° C. or less. The melting temperature is, as the range where the melting rate of the Ni-based single crystal superalloy part is not extremely slow, and further the evaporation of alloy elements is small and the composition control is easy, preferably in the range of 1400° C. to 1700° C., and particularly preferably in the range of 1500° C. to 1600° C.

The desulfurization treatment is performed in order to remove the adverse effects on the Ni-based single crystal superalloy part, which are given by sulfur components. The Ni-based single crystal superalloy part is influenced by the sulfur components contained in the fuel and the sulfurous acid gas in the atmospheric air due to the long-term use and flight, and the sulfur components penetrate inside the Ni-based single crystal superalloy part. Further, when a remelting of a recycled product is performed in a state in which the sulfur components have penetrated inside the Ni-based single crystal superalloy part, the high-temperature strength is lowered. In the desulfurization treatment, when a Ni-based single crystal superalloy part to be recycled is remelted, for example, a calcia (CaO) crucible is used.

The casting mold is a casting mold having a shape for casting a melting stock or a recycled NI-based single crystal superalloy part, and in casting a single crystal part, the casting mold is heated to a temperature of the melting temperature or more of the Ni-based single crystal superalloy. The temperature of the casting mold for the single crystal part is preferably a temperature suitable for growing the Ni-based single crystal superalloy, and when the temperature is extremely high, it becomes difficult to control the solidification, therefore, the temperature of the casting mold for the single crystal part is favorably around a temperature slightly higher as compared with the melting point of the Ni-based single crystal superalloy, for example, in the range of 1400° C. to 1600° C., and particularly preferably in the range of 1450° C. to 1500° C.

Subsequently, a desulfurized melted Ni-based single crystal superalloy is poured into a casting mold to obtain a melting stock or a single crystal part. The Ni-based single crystal superalloy has a microstructure in which preferably 60 to 70 vol % of a γ' phase ($L1_2$ ordered phase with $Ni_3Al$ as the basic composition) is coherently precipitated in a γ phase (Ni solid solution) that is the parent phase, and the interface dislocation network formed at the coherent interface suppresses the movement of dislocation to strengthen the Ni-based single crystal superalloy. Subsequently, the melting stock or the recycled Ni-based single crystal superalloy part is removed from the casting mold.

A method for recycling a Ni-based single crystal superalloy part of a second invention is, for example, as shown in FIG. 3, a method for recycling a Ni-based single crystal superalloy part of a first invention, and further favorably includes a step (S202) of peeling off a thermal barrier coating of the Ni-based single crystal superalloy part.

Preferably, in the recycling method of a second invention, the thermal barrier coating excluding a bond coating of a Ni-based single crystal superalloy part may be peeled off, or the thermal barrier coating including a bond coating of a Ni-based single crystal superalloy part may be peeled off.

In the method for recycling a Ni-based single crystal superalloy part of a second invention constituted as described above, with respect to the Ni-based single crystal superalloy part to be recycled, in a case where the thermal barrier coating remains, by peeling off the thermal barrier coating, the influence of the ceramic or metal elements contained in the thermal barrier coating is reduced.

A method for recycling a Ni-based single crystal superalloy part of a third invention is a method for recycling a Ni-based single crystal superalloy part in a case where a coating layer of an oxidation-resistant coating is damaged or damage occurs in the Ni-based single crystal superalloy substrate in a Ni-based single crystal superalloy part coated with the oxidation-resistant coating or an uncoated Ni-based single crystal superalloy part, which includes a step of melting and desulfurizing the Ni-based single crystal superalloy part at a temperature of the melting point or more of the Ni-based single crystal superalloy; a step of heating a casting mold for a recycled Ni-based single crystal superalloy part to have a temperature of the melting temperature or more of the Ni-based single crystal superalloy; a step of pouring a desulfurized melted Ni-based single crystal superalloy into a casting mold for a melting stock or a casting mold for a recycled Ni-based single crystal superalloy part to produce a melting stock or to grow the Ni-based single crystal superalloy; and a step of removing the melting stock or the recycled Ni-based single crystal superalloy part from the casting mold for a melting stock or the casting mold for a recycled Ni-based single crystal superalloy part.

A method for recycling a Ni-based single crystal superalloy part of a fourth invention is a method for recycling a Ni-based single crystal superalloy part of a third invention, and further, favorably includes a step of peeling off an oxidation-resistant coating of the Ni-based single crystal superalloy part coated with the oxidation-resistant coating.

Preferably, in a method for recycling a Ni-based single crystal superalloy part of a fifth invention, in the step of desulfurizing a Ni-based single crystal superalloy part, the Ni-based single crystal superalloy part is desulfurized so that the sulfur content of the Ni-based single crystal superalloy part is 3 PPM or less, and more preferably 2 PPM or less. When the sulfur content of the Ni-based single crystal superalloy part exceeds 3 PPM, the high temperature strength becomes insufficient as compared with the genuine material. When the sulfur content of the Ni-based single crystal superalloy part is 2 PPM or less, the high temperature strength is recovered to the extent equivalent to that of the genuine material.

Preferably, a method for recycling a Ni-based single crystal superalloy part of a sixth invention is a method for recycling a Ni-based single crystal superalloy part of the first to fifth inventions, and further, favorably includes a step (S105, or S207) of adding an element being deficient to perform composition adjustment so that the alloy composition of the recycled Ni-based single crystal superalloy tails within an acceptable composition range for the genuine material of the Ni-based single crystal superalloy part.

Preferably, a method for recycling a Ni-based single crystal superalloy part of a seventh invention favorably includes a step of forming a single crystal by unidirectional solidification in the step of growing a Ni-based single crystal superalloy; and further includes steps (S122, and S124) of subjecting the Ni-based single crystal superalloy part to a solution treatment and an aging precipitation treatment. The solution treatment means a heat treatment in which a γ' phase being a reinforcing phase of an alloy is heated to preferably a temperature or more at which a Ni-based single crystal superalloy part is completely melted to the solid solution, maintained for a sufficient period of time and homogenized, and further quenched to prevent the precipitation of a coarse γ' phase. In the solution treatment, for example, a heat treatment is performed at 1250° C. to 1380° C. for 0.5 to 4 hours, and then air-cooling is performed. The aging precipitation treatment means a heat treatment in which a product that has been subjected to a solution treatment (solution heat treatment) is soaked and held at an appropriate temperature in order to enhance the hardness, the strength, the corrosion resistance, and the like. As the aging treatment, a two-stage heat treatment is performed, in which for example, a temperature is kept at 1050° C. to 1150° C. for around 5 to 10 hours, and then air-cooling is performed, and further a temperature is kept at 850° C. to 900° C. for 20 hours, and then air-cooling is performed.

Preferably, a method for recycling a Ni-based single crystal superalloy part of an eighth invention further favorably includes a step (S126) of coating the recycled Ni-based single crystal superalloy part with a bond coating and a thermal barrier coating containing a ceramic, or with an oxidation-resistant coating. The thermal barrier coating includes a topcoat of a ceramic having low thermal conductivity, and a bond coating to prevent oxidation of a substrate. For the bond coating, a metal coating containing a large amount of Al, an equilibrium coating suppressing oxidation resistance and diffusion to a substrate, or the like is used.

Preferably, a method for recycling a Ni-based single crystal superalloy part of a ninth invention is favorably used in at least one of a turbine rotor blade, a turbine vane, a combustor liner, a splash plate, a duct segment, and a turbine disk of a Ni-based single crystal superalloy.

Even for an unidirectionally solidified material without having any crystal grain boundaries in the direction of principal stress, the creep strength and oxidation resistance equivalent to those of the genuine material can be obtained by desulfurization, and the recycling method of the present invention can be applied.

A method for recycling a Ni-based unidirectionally solidified superalloy part of a tenth invention is, for example, as shown in FIG. 9, a method for recycling a Ni-based unidirectionally solidified superalloy part in a case where a coating layer of a thermal barrier coating is damaged or damage occurs in the Ni-based unidirectionally solidified superalloy substrate in a Ni-based unidirectionally solidified superalloy part coated with the thermal barrier coating containing a ceramic, which includes a step (S304) of melting and desulfurizing the Ni-based unidirectionally solidified superalloy part at a temperature of the melting point or more of the Ni-based unidirectionally solidified superalloy and less than the melting point of the ceramic; a step (S306) of heating a casting mold for a recycled Ni-based unidirectionally solidified superalloy part to have a temperature of the melting temperature or more of the Ni-based unidirectionally solidified superalloy; a step (S308, or S310) of pouring a desulfurized melted Ni-based superalloy into a casting mold for a melting stock or a casting mold for a recycled Ni-based unidirectionally solidified superalloy part to produce a melting stock or to grow the Ni-based unidirectionally solidified superalloy; and a step (S312) of removing the melting stock or the recycled Ni-based unidirectionally solidified superalloy part from the casting mold for a melting stock or the casting mold for a recycled Ni-based unidirectionally solidified superalloy part.

Preferably, a method for recycling a Ni-based unidirectionally solidified superalloy part of an eleventh invention is for example, as shown in FIG. 9, a method for recycling a Ni-based unidirectionally solidified superalloy part of a tenth invention, and further favorably includes a step (S402) of peeling off a thermal barrier coating excluding a bond coating or a thermal barrier coating including a bond coating, of the Ni-based unidirectionally solidified superalloy part.

A method for recycling a Ni-based unidirectionally solidified superalloy part of a twelfth invention is a method for recycling a Ni-based unidirectionally solidified superalloy part in a case where a coating layer of an oxidation-resistant coating is damaged or damage occurs in the Ni-based unidirectionally solidified superalloy substrate in a Ni-based unidirectionally solidified superalloy part coated with the oxidation-resistant coating or an uncoated Ni-based unidirectionally solidified superalloy part, which includes a step of melting and desulfurizing the Ni-based unidirectionally solidified superalloy part at a temperature of the melting point or more of the Ni-based unidirectionally solidified superalloy; a step of heating a casting mold for a recycled Ni-based unidirectionally solidified superalloy part to have a temperature of the melting temperature or more of the Ni-based unidirectionally solidified superalloy; a step of pouring a desulfurized melted Ni-based superalloy into a casting mold for a melting stock or a casting mold for a recycled Ni-based unidirectionally solidified superalloy part to produce a melting stock or to grow the Ni-based unidirectionally solidified superalloy; and a step of removing the melting stock or the recycled Ni-based unidirectionally solidified superalloy part from the casting mold for a melting stock or the casting mold for a recycled Ni-based unidirectionally solidified superalloy part.

Preferably, a method for recycling a Ni-based unidirectionally solidified superalloy part of a thirteenth invention is a method for recycling a Ni-based unidirectionally solidified superalloy part of a twelfth invention, and further favorably includes a step of peeling off an oxidation-resistant coating of the Ni-based unidirectionally solidified superalloy part coated with the oxidation-resistant coating.

Preferably, in a method for recycling a Ni-based unidirectionally solidified superalloy part of a fourteenth invention, in the step of desulfurizing the Ni-based unidirectionally solidified superalloy part, the Ni-based unidirectionally solidified superalloy part is desulfurized so that the sulfur content of the Ni-based unidirectionally solidified superalloy part is 3 PPM or less, and more preferably 2 PPM or less. When the sulfur content of the Ni-based unidirectionally solidified superalloy part exceeds 3 PPM, the high temperature strength becomes insufficient as compared with the genuine material. When the sulfur content of the Ni-based unidirectionally solidified superalloy part is 2 PPM or less, the high temperature strength is recovered to the extent equivalent to that of the genuine material.

Preferably, a method for recycling a Ni-based unidirectionally solidified superalloy part of a fifteenth invention is a method for recycling a Ni based unidirectionally solidified superalloy part of tenth to fourteenth inventions, and favorably includes a step (S305, or S407) of adding an element being deficient to perform composition adjustment so that the alloy composition of the recycled Ni-based unidirectionally solidified superalloy falls within an acceptable composition range for the genuine material of the Ni-based unidirectionally solidified superalloy part.

Preferably, a method for recycling a Ni-based unidirectionally solidified superalloy part of a sixteenth invention further favorably includes steps (S322, and S324) of subjecting the recycled Ni-based unidirectionally solidified superalloy part to a solution treatment and an aging precipitation treatment.

Preferably, a method for recycling a Ni-based unidirectionally solidified superalloy part of a seventeenth invention further favorably includes the step of coating the recycled Ni-based unidirectionally solidified superalloy part with a bond coating and a thermal barrier coating containing a ceramic, or with an oxidation-resistant coating.

A method for recycling a Ni-based unidirectionally solidified superalloy part of an eighteenth invention is favorably used for at least one of a turbine rotor blade, a turbine vane, a combustor liner, a splash plate, a duct segment, and a turbine disk, of a Ni-based unidirectionally solidified superalloy.

Advantageous Effects of Invention

According to the method for recycling a Ni-based single crystal superalloy part or a Ni-based unidirectionally solidified superalloy part by direct remelting of the present invention, even if the sulfur components penetrate inside the Ni-based single crystal superalloy part or the Ni-based unidirectionally solidified superalloy part, under the influence of the sulfur components contained in the fuel and the sulfurous acid gas in the atmospheric air due to the long-term use and flight, the sulfur components are removed, therefore, the sulfur composition of the Ni-based single crystal superalloy part or the Ni-based unidirectionally solidified superalloy part is lowered to almost the same degree as that of the genuine material, and a recycled product having almost the same high-temperature strength as that of the genuine material of the Ni-based single crystal superalloy part or the Ni-based unidirectionally solidified superalloy part can be obtained.

In addition, since an already produced Ni-based single crystal superalloy part or Ni-based unidirectionally solidified superalloy part can be recycled without loss of the rare metal, there is an advantage that the problem of securing the supplier of the rare metal is alleviated, and further the problem of disposal of the industrial waste occurring in a large amount when alloy elements are recovered by refining a superalloy is also alleviated. Moreover, due to the spread of the method for recycling a Ni-based single crystal superalloy part or Ni-based unidirectionally solidified superalloy part of the present invention, the demand and price of the rare metal are stabilized, therefore, the spread of the Ni-based single crystal superalloy part or Ni-based unidirectionally solidified superalloy part, which is essential for improving the efficiency of the gas turbine, is promoted.

DESCRIPTION OF EMBODIMENTS

Hereinafter, the present invention will be described with reference to the drawings.

Figure 1:
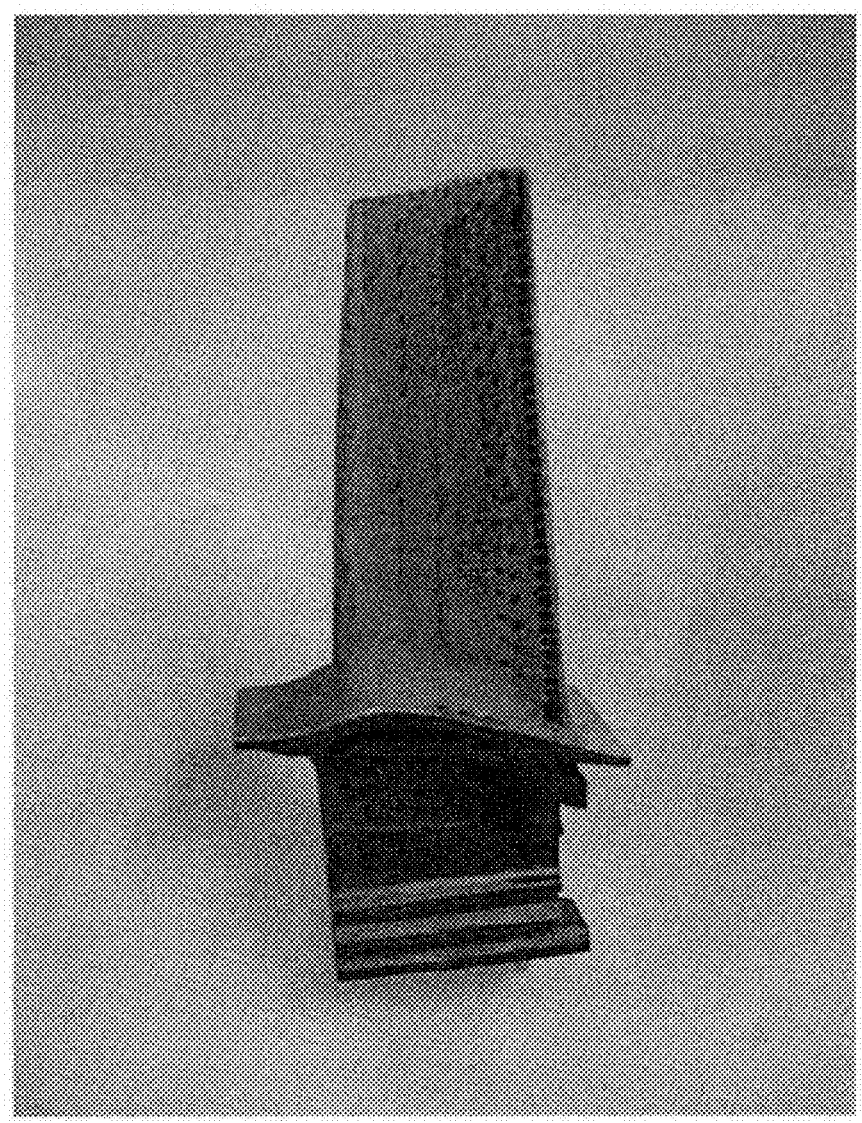
FIG. 1 is an overall perspective view of a used aircraft engine high-temperature high-pressure turbine rotor blade after peeling off a ceramic coating, and which is a photograph as a substitute for a drawing.
Figure 2:
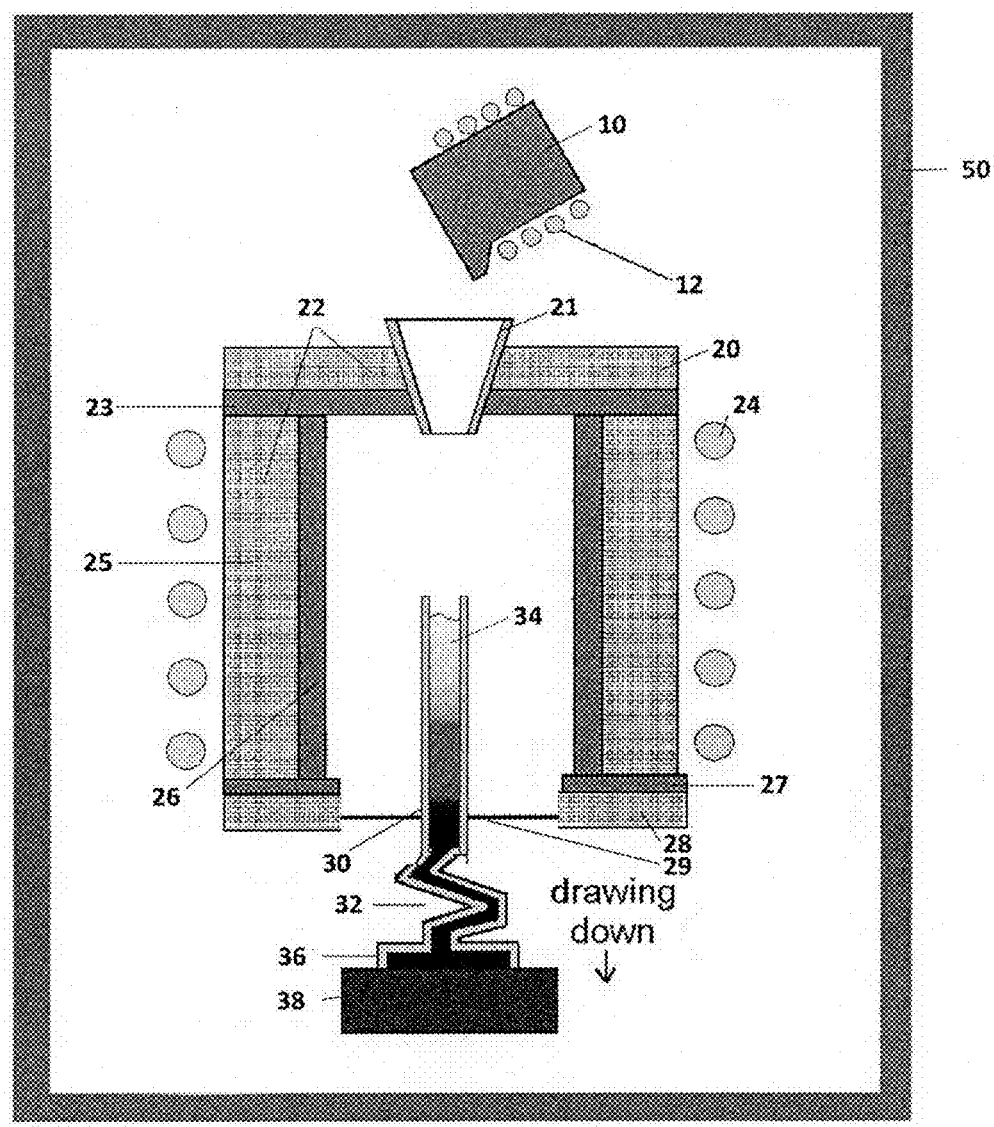
FIG. 2 is a schematic configuration diagram of a vacuum high frequency melting apparatus.

FIG. 2 is a schematic configuration diagram of a vacuum high frequency melting apparatus. In the diagram, the vacuum high frequency melting apparatus has a melting crucible 10, a mold heating furnace 20, a casting mold 30, a mold lifting mechanism (not shown), and a vacuum container 50.

The melting crucible 10 is a crucible for melting and desulfurizing a Ni-based superalloy part, and for example, a calcia (CaO) crucible is used. The melting crucible 10 has, for example, a cup shape with a pour-spout, and a high-frequency coil 12 for heating is provided on the outer peripheral part. Induction heating is a heating method using a phenomenon that when a conductor is inserted into a coil connected to an AC power supply, the conductor is heated from the surface even though the coil and the conductor are not in contact with each other, and Joule heat generated by the eddy current and the electric resistance of the conductor is used.

The mold heating furnace 20 has a molten metal receptacle 21, a lid part heat insulation part 22, a lid part heating part 23, a peripheral wall high frequency coil 24, a peripheral wall heat insulation part 25, a peripheral wall heating part 26, a bottom rim heating part 27, a bottom rim heat insulation part 28, and a bottom heat insulation part 29. The molten metal receptacle 21 is a guide part for pouring a molten metal poured from the melting crucible 10 into the casting mold 30. The lid part heating part 23, the peripheral wall heating part 26, and the bottom rim heating part 27 are heating elements for heating the inside of the mold heating furnace 20 to a temperature at which the molten metal is maintained, and use induction heating by the peripheral wall high frequency coil 24. The lid part heat insulation part 22, the peripheral wall heat insulation part 25, the bottom rim heat insulation part 28, and the bottom heat insulation part 29 are used for maintaining the casting mold 30 installed in the furnace of the mold heating furnace 20 at the melting temperature of the Ni-based single crystal superalloy.

The casting mold 30 is a casting mold having a shape for casting a melting stock or a recycled Ni-based single crystal superalloy part, and the casting mold for a single crystal part is heated to a temperature of the melting temperature or more of the Ni-based single crystal superalloy. In a case for a melting stock, the casting mold 30 may be an ordinary sand mold, or may be prepared by using a precision casting method or a lost wax method. In a case for a turbine rotor blade or a turbine vane, dimensional accuracy and surface roughness are extremely required for the finished product, therefore, the casting mold 30 is prepared by using a precision casting method such as a lost wax method. The precision casting method is a method that does not use a metal mold for a casting mold, and a complicated shape of a model can be cast by making a material of the casting mold into a slurry with a good fluidity. The lost wax method is a method in which a wax is used for a model, a model is wrapped with multiple refractory layers, and then the wax of the model is eluted or incinerated to make a casting mold.

A selector unit 32 is an elongated tube having a diameter of around several millimeters, and is arranged between the casting mold 30 and a chill plate (cooling plate) 38. A crystal is grown by selecting only one crystal orientation, and a single crystal of a Ni-based superalloy is formed: An in-mold molten metal part 34 is a molten metal of the Ni-based superalloy in the casting mold 30. A base solidified part 36 is a base part of the recycled Ni-based single crystal superalloy part solidified by the chill plate 38. For the chill plate 38, for example, a water-cooled copper plate is used.

The mold lifting mechanism raises and lowers the casting mold 30 placed on the chill plate 38. The single crystal solidified recycled Ni-based single crystal superalloy part is produced by an improved Bridgman method in which a casting mold is drawn downwardly from a mold heating furnace, and a molten metal part is cooled with radiation heat release, and solidified from the lower part to the upper part. For the cooling, a conduction cooling by contact with gas or liquid may be used in combination. The vacuum container 50 is a sealed container housing a melting crucible 10, a mold heating furnace 20, a casting mold 30, and a mold lifting mechanism, and in the vacuum container 50, all the processes in the casting of a recycled Ni-based single crystal superalloy part can be performed in a vacuum.

The solidified structure of the recycled Ni-based single crystal superalloy part is influenced by the combination of the temperature gradient at a solid-liquid interface and the solidification rate. In order to economically realize a sound single crystal structure, a fast solidification method is adopted. By properly setting the combination, grain boundary cracks and equiaxed crystals are not generated, and a structure with fine dendrite spacing is obtained.

In the casting of a recycled Ni-based single crystal superalloy part, if the temperature gradient is small, defects such as hetero crystals and freckles are generated, therefore, the temperature gradient at the solidification interface is made as large as possible so that a single crystal is stably grown.

A method for producing a recycled Ni-based single crystal superalloy part using the vacuum high frequency melting apparatus configured in this way will now be described below.

Figure 3:
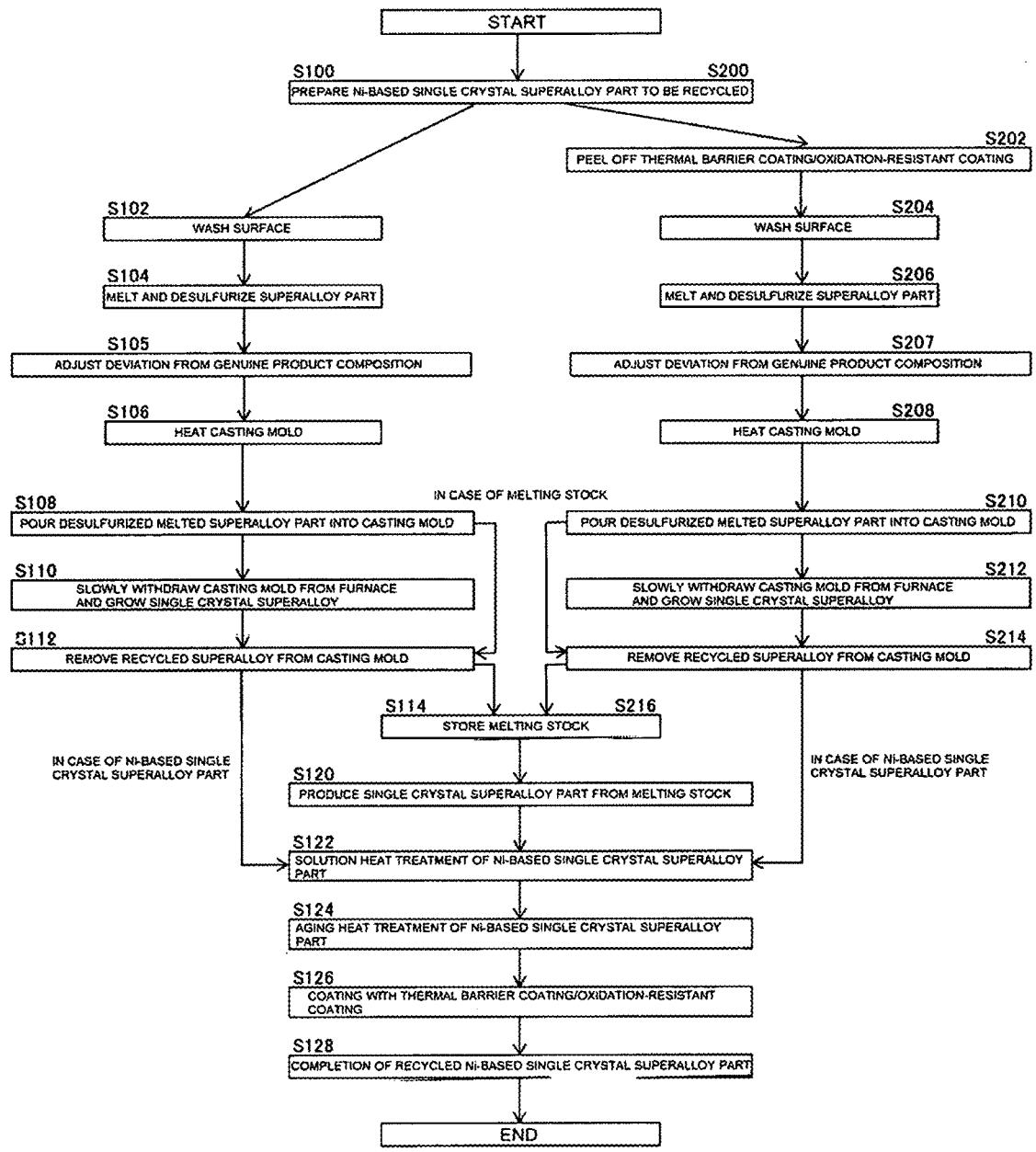
FIG. 3 is a flow chart for illustrating the method for recycling a Ni-based superalloy part of the present invention, and shows a case of a single crystal alloy.

FIG. 3 is a flow chart for illustrating the method for recycling a Ni-based single crystal superalloy part of the present invention, and shows a case of using the apparatus in FIG. 2. Firstly, a Ni-based single crystal superalloy part to be recycled is prepared (S100). The part to be recycled is one of the following types:

(i) A type in which a coating layer of a thermal barrier coating is damaged or damage occurs in a Ni-based single crystal superalloy substrate in a Ni-based single crystal superalloy part coated with the thermal barrier coating containing a ceramic, (for the thermal barrier coating, for example, a ceramic such as alumina, and zirconia can be used);

(ii) A type in which a coating layer of an oxidation resistance coating is damaged or damage occurs in a Ni-based single crystal superalloy substrate in a Ni-based single crystal superalloy part coated with the oxidation-resistant coating;

(iii) A type in which damage occurs in a Ni-based single crystal superalloy substrate in an uncoated Ni-based single crystal superalloy part; and (iv) A type corresponding to the above (i) to (iii), and determined to be technically and economically difficult to continuously use a Ni-based single crystal superalloy part in a gas turbine, or determined to be more economically advantageous to use the recycling method shown in the present patent application than to use the repaired one.

Firstly, a surface of the Ni-based single crystal superalloy part to be recycled is preferably washed (S102). Subsequently, the part to be recycled is dried. Next, the part to be recycled is charged into a melting crucible 10, and the Ni-based single crystal superalloy part is melted and desulfurized at a temperature of the melting point or more of the Ni-based single crystal superalloy and less than the melting point of a ceramic (S104). Note that the desulfurization treatment is not limited to a calcia (CaO) crucible, and there are the following embodiments.

(a) A type in which calcia (CaO) is charged in a state of solid or powder into a melting crucible, and separated from a molten metal after the lapse of around the time for which a desulfurization treatment is normally completed. Herein, the melting crucible is a crucible made of a ceramic such as alumina, and zirconia.
(b) In place of the calcia (CaO), $CaF_2$ may be used.
(c) In place of the calcia (CaO), MgO, SrO, BaO, $Ra_mO_n$ (Ra: lanthanoid), or a mixture thereof may be used.
(d) In place of the calcia (CaO), $MgF_2$, $SrF_2$, $BaF_2$, $Ra_mF_n$ (Ra: lanthanoid) or a mixture thereof may be used.

As the step of compensating for the reduction in weight of Al and the like, which occurs as a side reaction in a melting or desulfurization treatment of the Ni-based single crystal superalloy part, a step of adjusting the deviation from the genuine material composition may be provided (S105). Since a bond coating of the Ni-based single crystal superalloy part contains a metal coating layer, if the Ni-based single crystal superalloy part is remelted without perfectly peeling off the metal coating layer, the element composition ratio varies as compared with the genuine material. Further, since the Ni-based single crystal superalloy part is influenced by the sulfur components contained in the fuel and the sulfurous acid gas in the atmospheric air due to the long-term use and flight, and a sulfide is generated and peeled off, Al that tends to generate a sulfide is easily lost. Therefore, it is favorable that a composition ratio recovery treatment in which elements that have been lost as compared with the genuine material due to the influence of the residual metal coating layer or sulfurous acid gas are added to recover the element composition ratio to roughly the same as that of the genuine material is performed (S105). The expression "roughly the same" is referred to as a composition ratio in the acceptable range as the composition ratio of the genuine material.

In addition, a casting mold for a melting stock or a casting mold 30 for a recycled Ni-based single crystal superalloy part is placed in a mold heating furnace 20, and the casting mold 30 is heated so as to have a temperature of the melting temperature or more of the Ni-based single crystal superalloy in the mold heating furnace 20 (S106). Subsequently, the Ni-based single crystal superalloy melted in the melting crucible 10 is poured into the casting mold 30 (S108). The Ni-based single crystal superalloy is grown in the casting mold 30 using a mold lifting mechanism and a chill plate 38 (S110). Subsequently, the recycled Ni-based single crystal superalloy part is removed from the casting mold 30 (S112). In a case of recycling to a melting stock, the step (S106) of heating a casting mold and the step (S110) of growing a single crystal are omitted, and the solidified melting stock can be taken out (S112).

Note that the part to be recycled may be pre-treated. That is, a thermal barrier coating of the part to be recycled is peeled off (S202), and then a surface of the part to be recycled is washed (S204). Subsequently, a treatment similar to those in the steps S104 to S112 described above is continued. That is, the part to be recycled is charged into a melting crucible 10, and the Ni-based single crystal superalloy part is melted and desulfurized at a temperature of the melting point or more of the Ni-based single crystal superalloy (S206). As the step of compensating for the reduction in weight of Al and the like, which occurs as a side reaction in a melting or desulfurization treatment of the Ni-based single crystal superalloy part, a step of adjusting the deviation from the genuine material composition may be provided (S207).

In addition, a casting mold for a melting stock or a casting mold 30 for a recycled Ni-based single crystal superalloy part is placed in a mold heating furnace 20, and the casting mold 30 is heated so as to have a temperature of the melting temperature or more of the Ni-based single crystal superalloy in the mold heating furnace 20 (S208). Subsequently, the Ni-based single crystal superalloy melted in the melting crucible 10 is poured into the casting mold 30 (S210). The Ni-based single crystal superalloy is grown in the casting mold 30 using a mold lifting mechanism and a chill plate 38 (S212). Subsequently, the recycled Ni-based single crystal superalloy part is removed from the casting mold 30 (S214). In a case of recycling to a melting stock, the step (S208) of heating a casting mold and the step (S212) of growing a single crystal are omitted, and the solidified melting stock can be taken out (S214).

In this way, even when the material of a thermal barrier coating of the part to be recycled adversely affects the properties of a melting stock or a recycled Ni-based single crystal superalloy part, the influence can be reduced. In this recycling method, a thermal barrier coating excluding a bond coating or a thermal barrier coating including a bond coating may be peeled off. Further, the recycling method may be applied to a Ni-based single crystal superalloy part to which an oxidation-resistant coating has been only applied as it is or after peeling off the oxidation-resistant coating, or to an uncoated Ni-based single crystal superalloy part as it is.

In a case of recycling to a melting stock, the melting stock finished in S112 or S214 is stored (S114, or S216). In order to produce a recycled Ni-based single crystal superalloy part from the melting stock, a casting mold corresponding to the desired shape of a turbine rotor blade, a turbine vane, or the like is prepared, and using a vacuum high frequency melting apparatus, the melting stock is melted again in the melting crucible 10 (S120), and unidirectionally solidified to obtain a single crystal.

In a case where the recycled Ni-based single crystal superalloy part is a turbine rotor blade, a turbine vane, or the like of a Ni-based single crystal superalloy, the recycled Ni-based single crystal superalloy part is subjected to a solution treatment (S122), and then an aging precipitation treatment (S124). Through these solution treatment and aging precipitation treatment, a reinforcing phase (γ' phase) has an appropriate size and shape. Subsequently, the recycled Ni-based single crystal superalloy part is coated as needed with a thermal barrier coating containing a ceramic or with an oxidation-resistant coating (S126).

EXAMPLES

As Example 1 of a Ni-based single crystal superalloy, a high pressure turbine (HPT) rotor blade made of a PWA 1484 (trademark) material, which had been used in a jet engine, was melted directly by high frequency in a vacuum, and desulfurized using a calcia (CaO) crucible, and then a single crystal test specimen was cast (hereinafter, referred to as a composition-corrected desulfurized material). As a comparative material 1, a single crystal test specimen was cast using a genuine melting stock of a Ni-based single crystal superalloy PWA 1484 (trademark) material (hereinafter, referred to as genuine material). As a comparative material 2, a HPT rotor blade made of a PWA 1484 (trademark) material, which had been used in a jet engine, was melted as it is without adjusting the composition components directly by high frequency in a vacuum, and a single crystal test specimen was cast (hereinafter, referred to as simple recycled material). As a comparative material 3, a HPT rotor blade made of a PWA 1484 (trademark) material, which had been used in a jet engine, was melted directly by high frequency in a vacuum using a melting crucible made of a ceramic such as alumina, and zirconia after adjusting the composition components to the extent regarded as the genuine material, and a single crystal test specimen was cast (hereinafter, referred to as alloy composition-corrected material). The element composition of each sample material is shown in Table 1.

TABLE 1

| | | Co | Cr | Mo | W | Al | Ta | Hf | Re | Ni |
|---|---|---|---|---|---|---|---|---|---|---|
| Comparative Example 1 | Genuine material | 9.58 | 4.91 | 1.88 | 5.93 | 5.65 | 8.72 | 0.09 | 3.05 | Bal. |
| Comparative Example 2 | Simple recycled material | 9.85 | 5.07 | 1.88 | 5.81 | 5.58 | 8.43 | 0.10 | 2.96 | Bal. |
| Comparative Example 3 | Alloy composition-corrected material | 9.85 | 4.92 | 1.91 | 5.96 | 5.45 | 8.56 | 0.11 | 3.02 | Bal. |
| Example 1 | Composition-corrected desulfurized material | 9.64 | 4.41 | 1.93 | 6.21 | 5.42 | 8.86 | 0.09 | 3.16 | Bal. |

Figure 4:
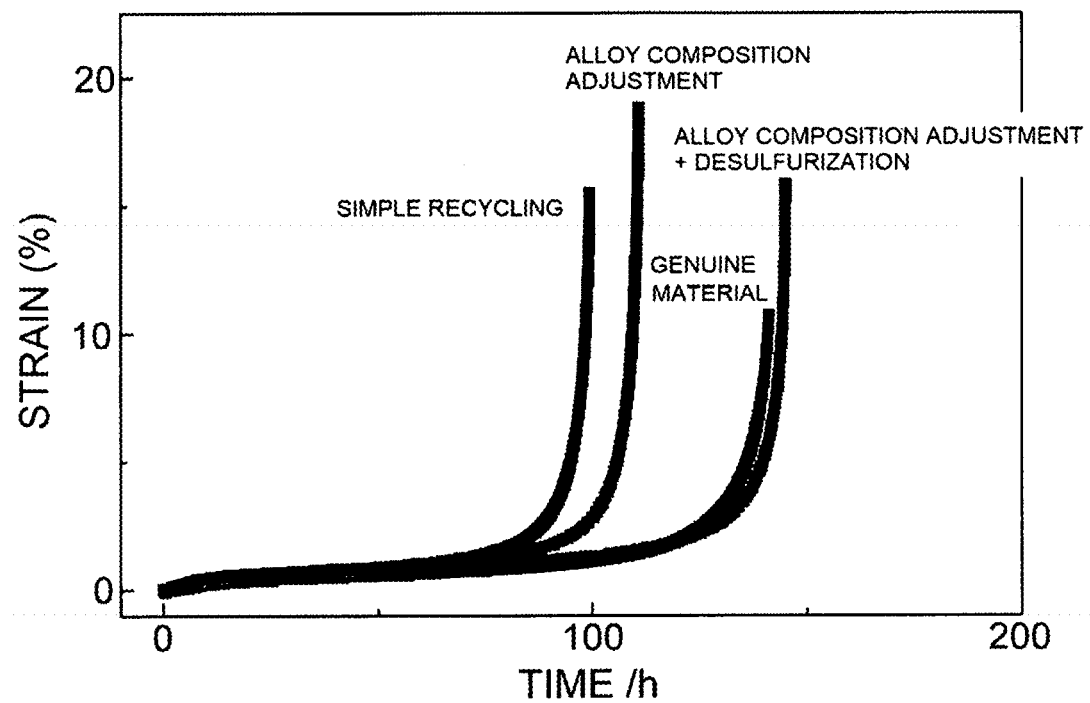
FIG. 4 shows the results of the creep tests at 1100° C. and 137 MPa.

Using these materials, a creep test and a high-temperature oxidation resistance test under typical conditions were performed for high-temperature strength comparison. FIG. 4 is a diagram showing the results of the creep tests at 1100° C. and 137 MPa. The test specimen to which composition adjustment and desulfurization had been performed showed the creep rupture life equivalent to that of the regular material. The specific numerical values are shown in the results of the creep tests at 1100° C. and 137 MPa of the regular material and recycled material in Table 2.

TABLE 2

| | | Temperature ° C. | Stress MPa | Lifetime h |
|---|---|---|---|---|
| Comparative Example 1 | Genuine material | 1100 | 137 | 141 |
| Comparative Example 2 | Simple recycled material | 1100 | 137 | 99 |
| Comparative Example 3 | Alloy composition-corrected material | 1100 | 137 | 127 |
| Example 1 | Composition-corrected desulfurized material | 1100 | 137 | 145 |

In the creep tests of Table 2, a composition-corrected desulfurized material of Example 1 showed the creep life that is the same as or slightly larger than that of the genuine material. Further, the increase of the composition-corrected desulfurized material of Example 1 showed a sufficient value for practical use. From these results, it was confirmed that the method for recycling a Ni-based single crystal superalloy part of the present invention is effective. On the other hand, in the simple recycled material of Comparative Example 2, although the creep life was around 40% shorter than the genuine material, the increase showed a value larger than that of the genuine material. In the alloy composition-corrected material of Comparative Example 3, although the creep life was around 30% shorter than the genuine material, the increase showed a value larger than that of the genuine material.

Figure 5:
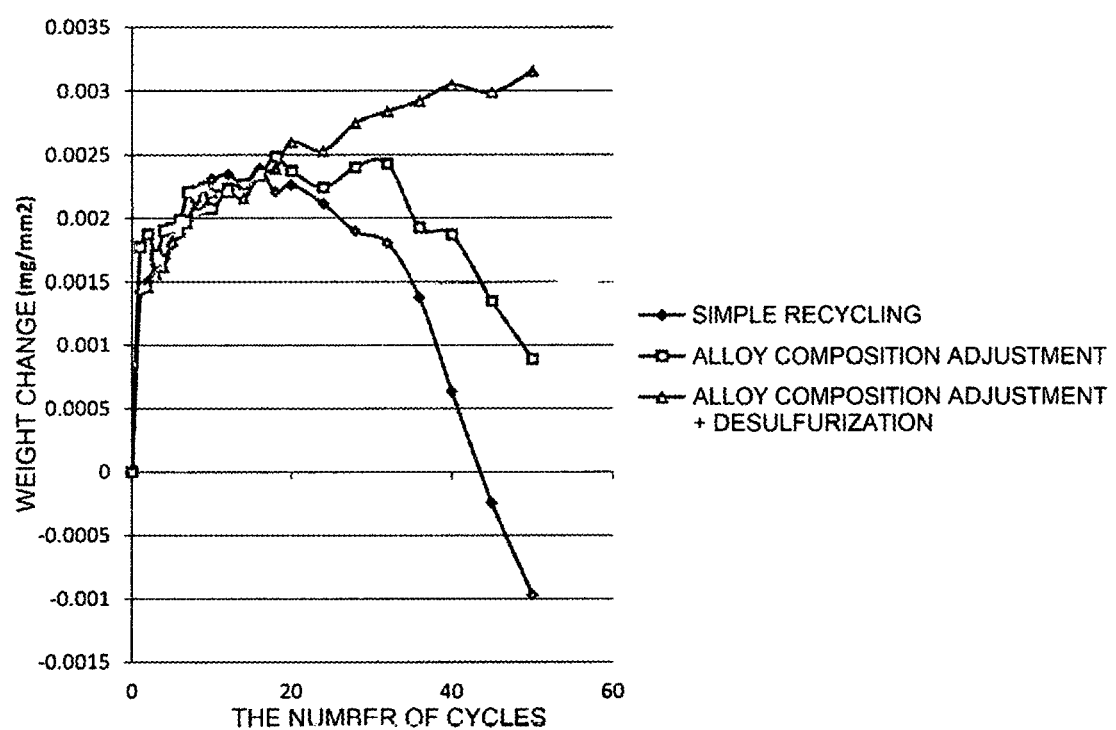
FIG. 5 shows the results of the repeated oxidation tests conducted under the condition of holding at 1100° C. for 1 hour and then holding at room temperature for 1 hour.

FIG. 5 is a diagram showing the results of the cyclic oxidation tests conducted under the condition of holding at 1100° C. for 1 hour and then holding at room temperature for 1 hour. In the composition-corrected desulfurized material of Example 1, the weight increase at 45 cycles was +0.003 [mg/mm²], and continuously the weight increase was shown, therefore, oxides were not peeled off from the Ni-based superalloy part, and the oxidation resistance equivalent to or more than that of the regular material was showed. On the other hand, in the simple recycled material of Comparative Example 2, the weight decrease at 45 cycles was −0.001 [mg/mm²], and a large decrease value was shown. In the alloy composition-corrected material of Comparative Example 3, the weight increase at 45 cycles was +0.001 [mg/mm²], and a value decreased from the maximum value of +0.0025 [mg/mm²] was shown. These results showed that in the recycling methods of Comparative Examples 2 and 3, the oxidation resistance was lower than that of the genuine material of Comparative Example 1.

From the above, as a result of the repeated oxidation test, it was shown that according to the present invention, a part can be recycled without deteriorating the oxidation resistance that is an important required characteristic of a turbine part.

Figure 6:
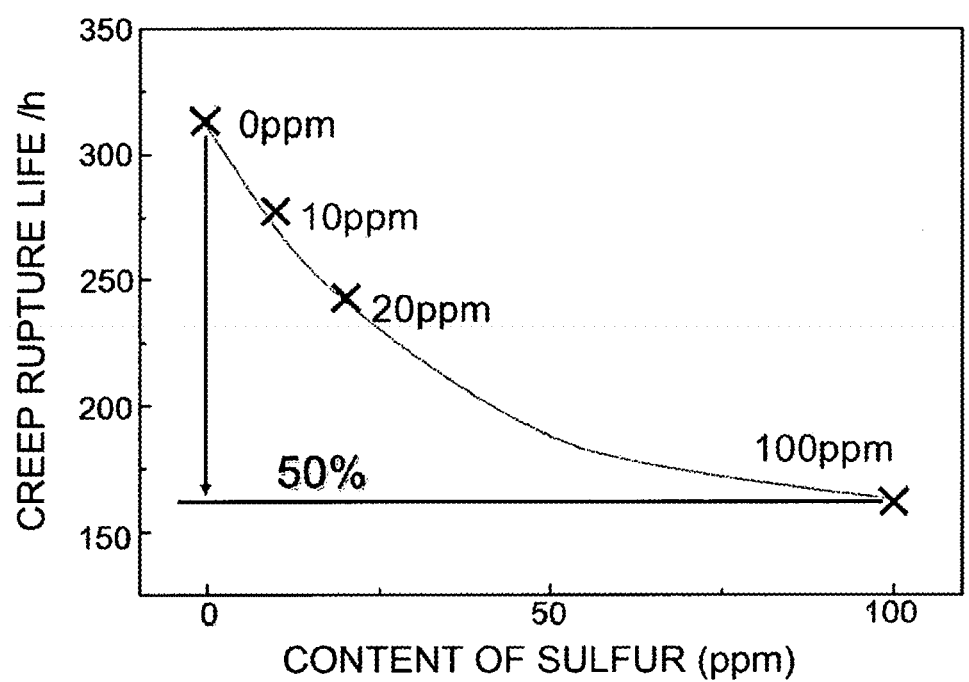
FIG. 6 is a diagram showing the relationship between the creep rupture life and the sulfur content of the Ni-based single crystal superalloy.

FIG. 6 is a diagram showing the relationship between the creep rupture life and the sulfur content of the Ni-based single crystal superalloy, and shows a case where the sulfur content is 0 pm, 10 ppm, 20 ppm, or 100 ppm. In a case where the sulfur content of the Ni-based single crystal superalloy was 100 ppm, the creep rupture life was halved as compared with that in a case of 0 ppm.

Figure 7:
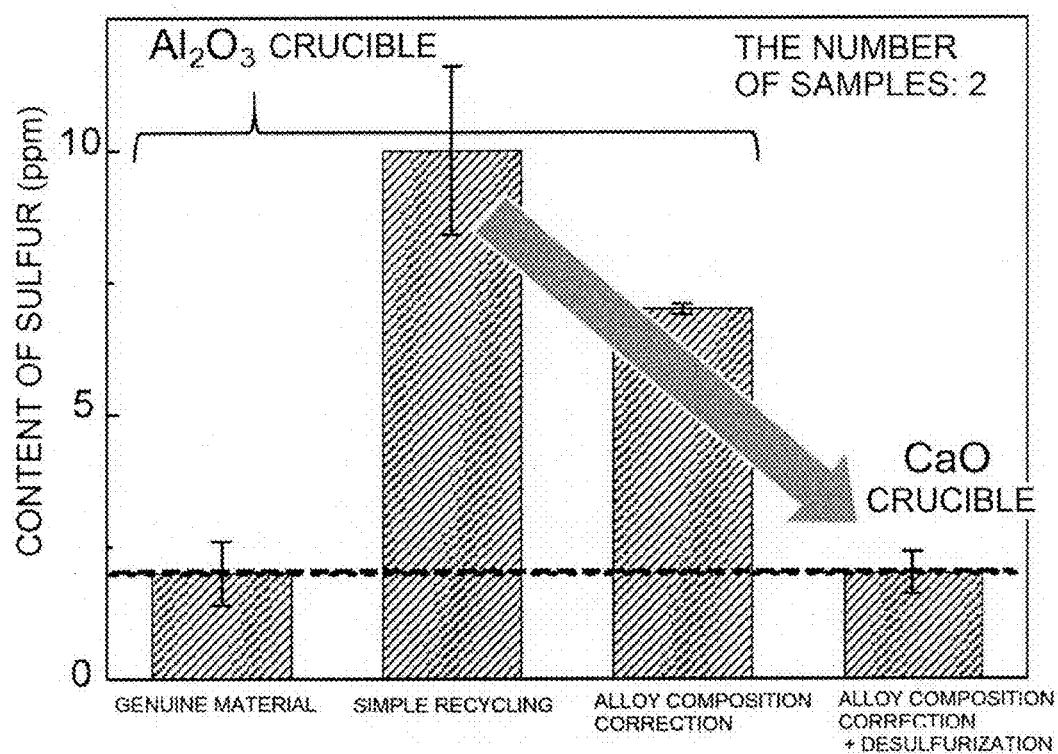
FIG. 7 is a diagram showing the relationship between the creep rupture life and the sulfur content of the Ni-based single crystal superalloy.

FIG. 7 is a diagram showing the relationship between the creep rupture life and the sulfur content of the Ni-based single crystal superalloy, and shows the comparison of the comparative materials 1 to 3 with Example 1 of the present invention. The sulfur content of the composition-corrected desulfurized material was 2 ppm, and was the same as that of the genuine material. On the other hand, the sulfur content of the simple recycled material was 10 ppm, and the sulfur composition amount of the alloy composition-corrected material was around 6 ppm. In a case of a desulfurization treatment using a calcia (CaO) crucible, in accordance with the following chemical reaction formula, due to the presence of an appropriate amount of Al, the sulfur content is reduced from 10 ppm for the simple recycled material to 2 ppm for the composition-corrected desulfurized material, for example, by a melting treatment for around 5 minutes to 10 minutes.

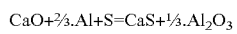  [Chemical formula 1]

Figure 8:
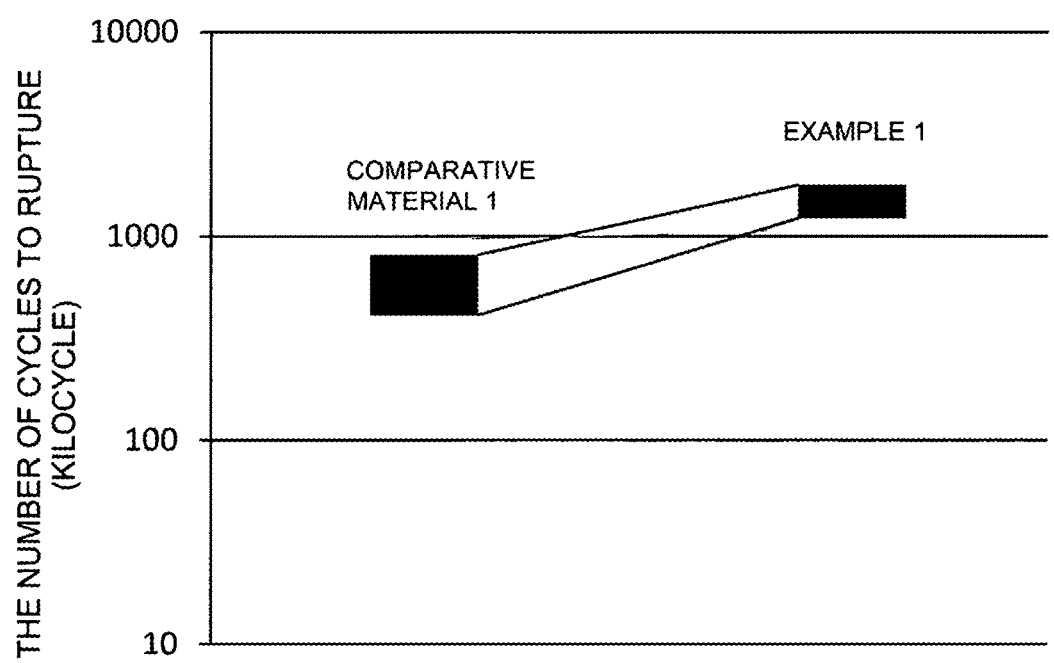
FIG. 8 is a graph showing a comparison of the results of the high cycle fatigue tests of a genuine material (Comparative material 1) and the recycle material (Example 1) according to the method of the present invention.

FIG. 8 is a graph showing the influence of the present invention on the high cycle fatigue life of the Ni-based single crystal superalloy by Comparative material 1 and Example 1. The test conditions are 1000° C., a maximum stress of 600 MPa, and a sine wave of 60 Hz, and the sulfur content of Example 1 is the same 2 ppm as that of Comparative material 1.

The high cycle fatigue life of Example 1 is 1,220,000 to 1,780,000 cycles, and is equivalent to or more than the 410,000 to 807,000 cycles of Comparative material 1 that is a genuine material. The results described above show that according to the present invention, a part can be recycled without deteriorating the high cycle fatigue life that is an important required characteristic of a turbine part.

Subsequently, as an embodiment of the present invention, a method for producing a recycled Ni-based unidirectionally solidified superalloy part will now be described. The recycled Ni-based unidirectionally solidified superalloy part is produced using the vacuum high frequency melting apparatus shown in FIG. 2. Note that in the description of the vacuum high frequency melting apparatus, unless contrary to the nature thereof, the Ni-based single crystal superalloy will be replaced with the Ni-based unidirectionally solidified superalloy. That is, the shape of a casting mold for a recycled Ni-based unidirectionally solidified superalloy part is the same as that of a casting mold for a recycled Ni-based single crystal superalloy part except that the selector unit 32 is not provided.

Figure 9:
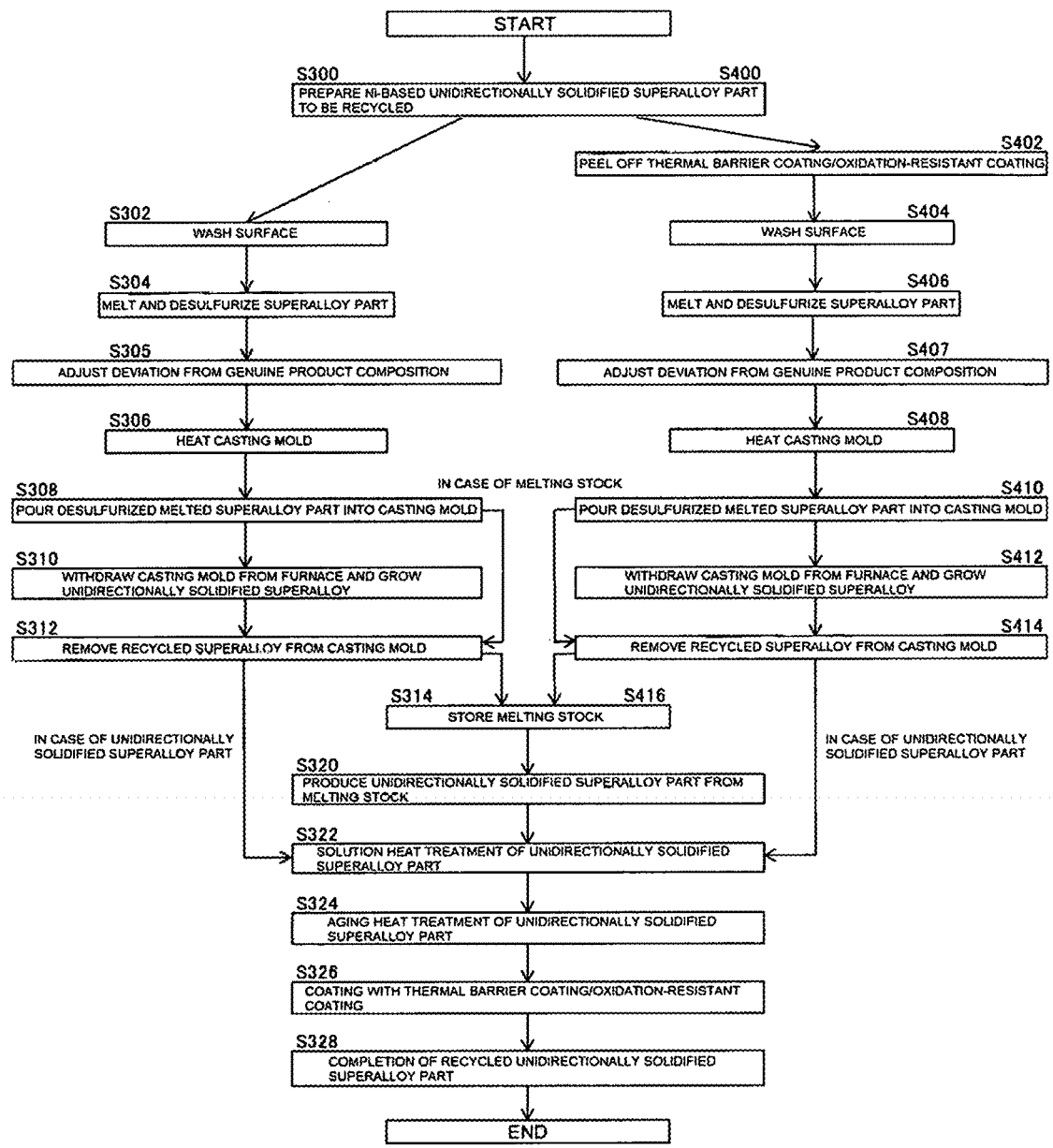
FIG. 9 is a flow chart for illustrating the method for recycling a Ni-based superalloy part of the present invention, and shows a case of an unidirectionally solidified alloy.

FIG. 9 is a flow chart for illustrating the method for recycling a Ni-based unidirectionally solidified superalloy part of the present invention, and shows a case of using the apparatus in FIG. 2. Firstly, a Ni-based unidirectionally solidified superalloy part to be recycled is prepared (S300), Firstly, a surface of the Ni-based unidirectionally solidified superalloy part to be recycled is preferably washed (S302). Subsequently, the part to be recycled is dried. Next, the part to be recycled is charged into a melting crucible 10, and the Ni-based unidirectionally solidified superalloy part is melted and desulfurized at a temperature of the melting point or more of the Ni-based unidirectionally solidified superalloy and less than the melting point of a ceramic (S304). As the step of compensating for the reduction in weight of Al and the like, which occurs as a side reaction in a melting or desulfurization treatment of the Ni-based unidirectionally solidified superalloy part, a step of adjusting the deviation from the genuine material composition may be provided (S305).

In addition, a casting mold for a melting stock or a casting mold 30 for a recycled Ni-based unidirectionally solidified superalloy part is placed in a mold heating furnace 20, and the casting mold 30 is heated so as to have a temperature of the melting temperature or more of the Ni-based unidirectionally solidified superalloy in the mold heating furnace 20 (S306). Subsequently, the Ni-based superalloy melted in the melting crucible 10 is poured into the casting mold 30 (S308). The Ni-based unidirectionally solidified superalloy is grown in the casting mold 30 using a mold lifting mechanism and a chill plate 38 (S310). Subsequently, the recycled Ni-based unidirectionally solidified superalloy part is removed from the casting mold 30 (S312). In a case of recycling to a melting stock, the step (S306) of heating a casting mold and the step (S310) of growing a single crystal are omitted, and the solidified melting stock can be taken out (S312).

Note that the part to be recycled may be pre-treated. That is, the thermal barrier coating of the part to be recycled is peeled off (S402), and then the surface of the part to be recycled is washed (S404). Subsequently, a treatment similar to those in the steps S304 to S312 described above is continued. That is, the part to be recycled is charged into a melting crucible 10, and the Ni-based unidirectionally solidified superalloy part is melted and desulfurized at a temperature of the melting point or more of the Ni-based unidirectionally solidified superalloy (S406). As the step of compensating for the reduction in weight of Al and the like, which occurs as a side reaction in a melting or desulfurization treatment of the Ni-based unidirectionally solidified superalloy part, a step of adjusting the deviation from the genuine material composition may be provided (S407).

In addition, a casting mold for a melting stock or a casting mold 30 for a recycled Ni-based unidirectionally solidified superalloy part is placed in a mold heating furnace 20, and the casting mold 30 is heated so as to have a temperature of the melting temperature or more of the Ni-based unidirectionally solidified superalloy in the mold heating furnace 20 (S408). Subsequently, the Ni-based superalloy melted in the melting crucible 10 is poured into the casting mold 30 (S410). The Ni-based unidirectionally solidified superalloy is grown in the casting mold 30 using a mold lifting mechanism and a chill plate 38 (S412). Subsequently, the recycled Ni-based unidirectionally solidified superalloy part is removed from the casting mold 30 (S414). In a case of recycling to a melting stock, the step (S408) of heating a casting mold and the step (S412) of growing a single crystal are omitted, and the solidified melting stock can be taken out (S414).

In this way, even when the material of a thermal barrier coating of the part to be recycled adversely affects the properties of a melting stock or a recycled Ni-based unidirectionally solidified superalloy part, the influence can be reduced. In this recycling method, a thermal barrier coating excluding a bond coating or a thermal barrier coating including a bond coating may be peeled off. Further, the recycling method may be applied to a Ni-based unidirectionally solidified superalloy part to which an oxidation-resistant coating has been only applied as it is or after peeling off the oxidation-resistant coating, or to an uncoated Ni-based unidirectionally solidified superalloy part as it is.

In a case of recycling to a melting stock, the melting stock finished in S312 or S414 is stored (S314, or S416). In order to produce a recycled Ni-based unidirectionally solidified superalloy part from the melting stock, a casting mold corresponding to the desired shape of a turbine rotor blade, a turbine vane, or the like is prepared, and using a vacuum high frequency melting apparatus, the melting stock is melted again in the melting crucible 10 (S320), and unidirectionally solidified to obtain a unidirectionally solidified part.

In a case where the recycled Ni-based unidirectionally solidified superalloy part is a turbine rotor blade, a turbine vane, or the like of a Ni-based unidirectionally solidified superalloy, the recycled Ni-based unidirectionally solidified superalloy part is subjected to a solution treatment (S322), and then to an aging precipitation treatment (S324). Through these solution treatment and aging precipitation treatment, a reinforcing phase ($\gamma'$ phase) has an appropriate size and shape. Subsequently, the recycled Ni-based unidirectionally solidified superalloy part is coated as needed with a thermal barrier coating containing a ceramic or with an oxidation-resistant coating (S326).

In addition, in the embodiments described above, a case of recycling to a melting stock and to a turbine rotor blade or turbine vane as the recycled Ni-based single crystal superalloy part is shown, however, the present invention is not limited to thereto, and the recycling can be applied by forming a single crystal part or a unidirectionally solidified part by using a vacuum high frequency melting apparatus even if the part is a larger part as compared with a combustor liner, a splash plate, a turbine disk, a turbine rotor blade, a turbine vane, a duct segment, or the like.

INDUSTRIAL APPLICABILITY

According to the method for recycling a Ni-based single crystal superalloy part of the present invention, even if the sulfur components penetrate inside the Ni-based single crystal superalloy part, under the influence of the sulfur components contained in the fuel and the sulfurous acid gas in the atmospheric air due to the long-term use and flight, the sulfur content of the Ni-based single crystal superalloy part can be lowered to almost the same degree as that of the genuine material by a desulfurization treatment. Therefore, even if the initial production cost is higher than that of the ordinary cast alloy or the unidirectionally solidified alloy, the recycle cost related to a maintenance cost is inexpensive, therefore, the lifetime cost of the Ni-based single crystal superalloy part is lowered, and the spread of the Ni-based single crystal superalloy part is promoted.

In addition, since an already produced Ni-based single crystal superalloy part can be recycled without loss of the rare metal, there is an advantage that the problem of securing the supplier of the rare metal is alleviated, and further the problem of disposal of the industrial waste occurring in a large amount when alloy elements are recovered by refining the superalloy is also alleviated.

Further, the method for recycling a Ni-based single crystal superalloy part by direct remelting of the present invention is similarly applied to a Ni-based unidirectionally solidified superalloy part.

REFERENCE SIGNS LIST

10 Melting crucible (calcia crucible)
20 Mold heating furnace
30 Casting mold
50 Vacuum container

The invention claimed is:

1. A method for recycling a Ni-based single crystal superalloy part provided with a thermal barrier coating containing at least a ceramic on a surface of a Ni-based single crystal superalloy substrate, the method comprising the steps of:
    melting and desulfurizing the Ni-based single crystal superalloy part at a temperature in a range from 1400° C. to 2000° C. to prepare a desulfurized Ni-based single crystal superalloy; and
    forming a recycled Ni-based single crystal superalloy part or a melting stock using the Ni-based single crystal superalloy,
    wherein
    in the step of desulfurizing the Ni-based single crystal superalloy part, the Ni-based single crystal superalloy part is desulfurized so that a sulfur content of the Ni-based single crystal superalloy part is 3 PPM or less, and
    in a case of directly forming the recycled Ni-based single crystal superalloy part, the method comprises the steps of:
    heating a casting mold for a recycled Ni-based single crystal superalloy part to have a temperature in a range from 1400° C. to 1600° C.;
    pouring the melted Ni-based single crystal superalloy into the casting mold for a recycled Ni-based single crystal superalloy part to grow the Ni-based single crystal superalloy; and
    removing the recycled Ni-based single crystal superalloy part from the casting mold for a recycled Ni-based single crystal superalloy part, and
    in a case of forming a recycled Ni-based single crystal superalloy part from a melting stock, the method comprises the steps of:
    pouring the melted Ni-based single crystal superalloy into a casting mold for a melting stock to form a melting stock;
    removing the melting stock from the casting mold for a melting stock; and
    producing a Ni-based single crystal superalloy part from the melting stock.

2. The method for recycling a Ni-based single crystal superalloy part according to claim 1, wherein the method comprises the step of:
  peeling off a thermal barrier coating excluding a bond coating or a thermal barrier coating including a bond coating, of the Ni-based single crystal superalloy part.

3. The method for recycling a Ni-based single crystal superalloy part according to claim 1, wherein
  the step of growing the recycled Ni-based single crystal superalloy comprises the steps of:
  forming a single crystal by unidirectional solidification; and
  subjecting the recycled Ni-based single crystal superalloy part to a solution treatment and an aging precipitation treatment.

4. The method for recycling a Ni-based single crystal superalloy part according to claim 1, wherein the method comprises the steps of:
  coating the recycled Ni-based single crystal superalloy part with a bond coating and a thermal barrier coating containing a ceramic, or with an oxidation-resistant coating.

5. The method for recycling a Ni-based single crystal superalloy part according to claim 1, wherein
  the recycled Ni-based single crystal superalloy part is at least one of a turbine rotor blade, a turbine vane, a combustor liner, a splash plate, a duct segment, and a turbine disk, of a Ni-based single crystal superalloy.

6. The method for recycling a Ni-based single crystal superalloy part according to claim 1, wherein
  the step of melting and desulfurizing the Ni-based single crystal superalloy part is performed at a temperature in a range from 1500° C. to 1700° C., and
  in the case of directly forming the recycled Ni-based single crystal superalloy part, the casting mold for the recycled Ni-based single crystal superalloy part is heated to have a temperature in a range from 1450° C. to 1600° C.

7. A method for recycling a Ni-based single crystal superalloy part provided with an oxidation-resistant coating or a Ni-based single crystal superalloy part not provided with an oxidation-resistant coating, on a surface of a Ni-based single crystal superalloy substrate, the method comprising the steps of:
  melting and desulfurizing the Ni-based single crystal superalloy part at a temperature in a range from 1400° C. to 2000° C. to prepare a desulfurized Ni-based single crystal superalloy; and
  forming a recycled Ni-based single crystal superalloy part or a melting stock using the Ni-based single crystal superalloy,
  wherein
  in the step of desulfurizing the Ni-based single crystal superalloy part, the Ni-based single crystal superalloy part is desulfurized so that a sulfur content of the Ni-based single crystal superalloy part is 3 PPM or less, and
  in a case of directly forming the recycled Ni-based single crystal superalloy part, the method comprises the steps of:
  heating a casting mold for a recycled Ni-based single crystal superalloy part to have a temperature in a range from 1400° C. to 1600° C.;
  pouring the melted Ni-based single crystal superalloy into the casting mold for a recycled Ni-based single crystal superalloy part to grow the Ni-based single crystal superalloy; and
  removing the recycled Ni-based single crystal superalloy part from the casting mold for a recycled Ni-based single crystal superalloy part, and
  in a case of forming a recycled Ni-based single crystal superalloy part from a melting stock, the method comprises the steps of:
  pouring the melted Ni-based single crystal superalloy into a casting mold for a melting stock to form a melting stock;
  removing the melting stock from the casting mold for a melting stock; and
  producing a Ni-based single crystal superalloy part from the melting stock.

8. The method for recycling a Ni-based single crystal superalloy part according to claim 7, wherein the method comprises the step of:
  peeling off an oxidation-resistant coating of the Ni-based single crystal superalloy part coated with the oxidation-resistant coating.

9. The method for recycling a Ni-based single crystal superalloy part according to claim 7, wherein
  the step of growing the recycled Ni-based single crystal superalloy comprises the steps of:
  forming a single crystal by unidirectional solidification; and
  subjecting the recycled Ni-based single crystal superalloy part to a solution treatment and an aging precipitation treatment.

10. The method for recycling a Ni-based single crystal superalloy part according to claim 7, wherein the method comprises the steps of:
  coating the recycled Ni-based single crystal superalloy part with a bond coating and a thermal barrier coating containing a ceramic, or with an oxidation-resistant coating.

11. The method for recycling a Ni-based single crystal superalloy part according to claim 7, wherein
  the recycled Ni-based single crystal superalloy part is at least one of a turbine rotor blade, a turbine vane, a combustor liner, a splash plate, a duct segment, and a turbine disk, of a Ni-based single crystal superalloy.

12. The method for recycling a Ni-based single crystal superalloy part according to claim 7, wherein
  the step of melting and desulfurizing the Ni-based single crystal superalloy part is performed at a temperature in a range from 1500° C. to 1700° C., and
  in the case of directly forming the recycled Ni-based single crystal superalloy part, the casting mold for the recycled Ni-based single crystal superalloy part is heated to have a temperature in a range from 1450° C. to 1600° C.

13. A method for recycling a Ni-based unidirectionally solidified superalloy part provided with a thermal barrier coating containing at least a ceramic on a surface of a Ni-based unidirectionally solidified superalloy substrate, the method comprising the steps of:
  melting and desulfurizing the Ni-based unidirectionally solidified superalloy part at a temperature in a range from 1400° C. to 2000° C. to prepare a desulfurized Ni-based superalloy; and
  forming a recycled Ni-based unidirectionally solidified superalloy part or a melting stock using the Ni-based unidirectionally solidified superalloy,
  wherein
  in the step of desulfurizing the Ni-based unidirectionally solidified superalloy part, the Ni-based unidirectionally solidified superalloy part is desulfurized so that a sulfur content of the Ni-based unidirectionally solidified superalloy part is 3 PPM or less, and in a case of directly forming the recycled Ni-based unidirectionally solidified superalloy part, the method comprises the steps of:

heating a casting mold for a recycled Ni-based unidirectionally solidified superalloy part to have a temperature in a range from 1400° C. to 1600° C.;

pouring the melted Ni-based superalloy into the casting mold for a recycled Ni-based unidirectionally solidified superalloy part to grow the Ni-based unidirectionally solidified superalloy; and removing the recycled Ni-based unidirectionally solidified superalloy part from the casting mold for a recycled Ni-based unidirectionally solidified superalloy part, and in a case of forming a recycled Ni-based unidirectionally solidified superalloy part from a melting stock, the method comprises the steps of:

pouring the melted Ni-based unidirectionally solidified superalloy into a casting mold for a melting stock to form a melting stock;

removing the melting stock from the casting mold for a melting stock; and producing a Ni-based unidirectionally solidified superalloy from the melting stock.

14. The method for recycling a Ni-based unidirectionally solidified superalloy part according to claim 13, wherein the method comprises the step of:

peeling off a thermal barrier coating excluding a bond coating or a thermal barrier coating including a bond coating, of the Ni-based unidirectionally solidified superalloy part.

15. The method for recycling a Ni-based unidirectionally solidified superalloy part according to claim 13, wherein the method comprises the step of:

subjecting the recycled Ni-based unidirectionally solidified superalloy part to a solution treatment and an aging precipitation treatment.

16. The method for recycling a Ni-based unidirectionally solidified superalloy part according to claim 13, wherein the method comprises the step of:

coating the recycled Ni-based unidirectionally solidified superalloy part with a bond coating and a thermal barrier coating containing a ceramic, or with an oxidation-resistant coating.

17. The method for recycling a Ni-based unidirectionally solidified superalloy part according to claim 13, wherein the recycled Ni-based unidirectionally solidified superalloy part is at least one of a turbine rotor blade, a turbine vane, a combustor liner, a splash plate, a duct segment, and a turbine disk, of a Ni-based unidirectionally solidified superalloy.

18. The method for recycling a Ni-based unidirectionally solidified superalloy part according to claim 13, wherein the step of melting and desulfurizing the Ni-based unidirectionally solidified superalloy part is performed at a temperature in a range from 1500° C. to 1700° C., and in the case of directly forming the recycled Ni-based unidirectionally solidified superalloy part, the casting mold for the recycled Ni-based unidirectionally solidified superalloy part is heated to have a temperature in a range from 1450° C. to 1600° C.

* * * * *